United States Patent Office 2,890,740
Patented June 16, 1959

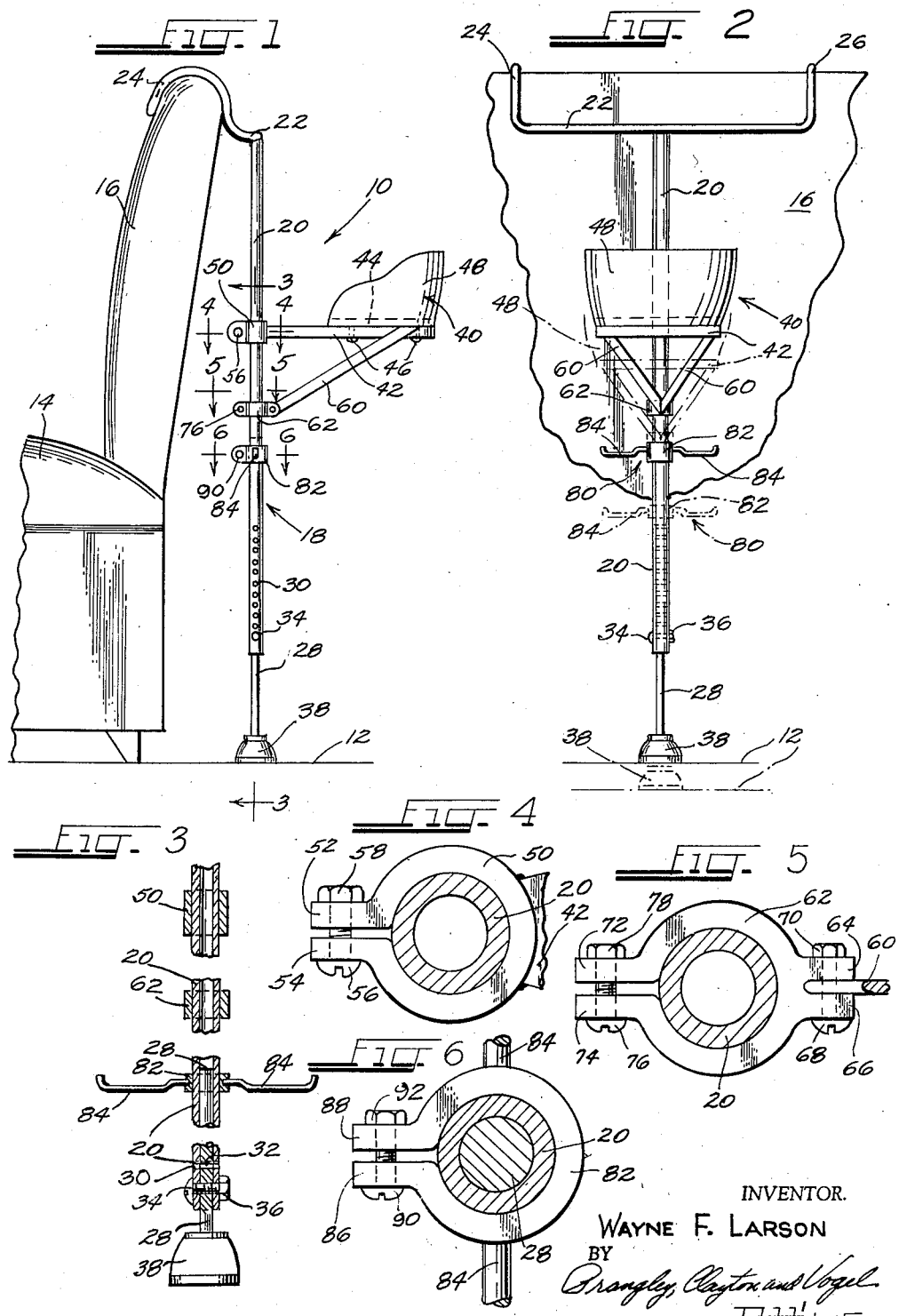

2,890,740

CAR SEAT

Wayne F. Larson, Springfield, Ill.

Application July 22, 1957, Serial No. 673,228

4 Claims. (Cl. 155—12)

This invention relates to seats and particularly auxiliary seats for children for use in automobiles.

Small children have difficulty riding in the ordinary automobile seat. Usually they cannot see out of the windows unless they stand up and standing in a moving automobile is dangerous. There have been provided heretofore various auxiliary seats for use in automobiles by attachment to one of the seats. Often the use of such auxiliary seats interferes with the use of the regular automobile seat on which they are mounted whereby to reduce the effective capacity of the automobile. Certain of the prior seats are uncomfortable in use and offer no opportunity for play or entertainment.

Accordingly, it is an important object of the present invention to provide an auxiliary seat for children for use in an automobile.

Another object of the invention is to provide an auxiliary seat of the type set forth which can be firmly mounted within the automobile whereby to provide absolute safety for the child using the seat.

In conjunction with the foregoing object, it is another object of the invention to provide an auxiliary seat which is mounted upon and directly behind the front seat of the automobile whereby the child is protected against being thrown through the windshield in the event of sudden stops of the automobile.

Still another object of the invention is to provide a seat of the type set forth which is adjustable to accommodate varying sizes of children and which is provided with a foot rest also adjustable for use by different sizes of children.

These and other objects and advantages of the invention will be better understood from the following description when taken in conjunction with the accompanying drawing. In the drawing wherein like reference numerals have been utilized to designate like parts throughout:

Figure 1 is a side elevational view with certain parts broken away illustrating an auxiliary seat made in accordance with and embodying the principles of the present invention mounted in operative position in an automobile;

Figure 2 is a rear view of the auxiliary seat of Figure 1 illustrating more particularly the attachment to the front seat of the automobile, the parts being shown in solid lines for one height of automobile seat back and the parts being shown in dashed lines for another adjustment for use with a different height of seat back;

Figure 3 is an enlarged view in vertical section with certain portions broken away through the support for the auxiliary seat substantially as seen in the direction of the arrows along the line 3—3 of Figure 1;

Figure 4 is an enlarged view in horizontal section showing the mounting of the seat support upon the support tube;

Figure 5 is an enlarged view in horizontal section illustrating the connection between the seat brace and the support tube substantially as seen in the direction of the arrows along the line 5—5 of Figure 1; and Figure 6 is an enlarged view in horizontal section illustrating the connection between the foot rest and the support tube.

Referring specifically to Figures 1 and 2 of the drawing, there is shown an auxiliary seat, generally designated by the numeral 10, made in accordance with and embodying the principles of the present invention. Seat 10 is shown mounted in an automobile having a floor 12 upon which is mounted an automobile front seat 14 having an upstanding back 16.

Seat 10 includes a substantially vertically disposed support generally designated by the numeral 18 and including a support tube 20 which is preferably cylindrical in cross section and hollow throughout the length thereof. Attached to the upper end of support tube 20 is a cross bar 22 extending laterally outwardly therefrom. Any suitable means such as welding can be utilized to interconnect tube 20 and cross bar 22. Formed on the outer ends of cross bar 22 are forwardly directed hooks 24 and 26 which are shaped and adapted to fit over the top of seat back 16. Received within the lower end of tube 20 is a post 28 which is illustrated as being solid in cross section although it is to be understood that a tube similar to tube 20 but smaller in diameter may be used in place thereof. Post 28 is circular in cross section and is adapted to be received within the circular opening in tube 20.

Means is provided adjustably to interconnect support tube 20 and post 28. More specifically, a plurality of aligned apertures 30 is formed in support tube 20 adjacent to the lower end thereof. Apertures 30 are disposed generally along a diameter of support tube 20 and extend through both of the opposed wall sections thereof. Preferably, apertures 30 are spaced apart at regular distances such as one inch whereby to provide for a wide range of adjustability in relatively small increments. A corresponding series of apertures 32 is formed in post 28 and can be arranged for alignment with apertures 30 (see Figure 3 particularly). Passing through one of the sets of apertures 30 and through an aligned aperture 32 in post 28 is a bolt 34 which is provided with a head on one end and with a thread on the other end whereby threadedly to receive a nut 36. By passing bolt 34 through aligned apertures 30 and 32 any desired adjustment between support tube 20 and post 28 can be obtained.

In order to provide a firm and secure positioning for the lower end of post 28 with respect to floor 12, there is provided on the lower end of post 28 an anti-skid member in the form of a flexible suction cup 38. Suction cup 38 preferably is formed of some resilient material such as rubber or synthetic organic plastic. Suction cup 38 particularly when the weight of a child is imposed thereon will grip floor 12 whereby to prevent undesired relative movement between support 18 and floor 12.

Mounted upon support 18 is a suitable seat generally designated by the numeral 40. Seat 40 includes a seat support 42 provided with an attached seat member 44 connected thereto by bolts 46. A back rest 48 is also provided on seat member 44. Seat support 42 extends forwardly and has secured to the forward end thereof a substantially circular clamp 50 which is adapted to engage around support tube 20. Formed on the spaced apart confronting free ends of clamp 50 are flanges 52 and 54 which are apertured to receive therethrough a bolt 56 which threadedly receives and cooperates with a nut 58. By tightening nut 58 on bolt 56 it is possible to tighten clamp 50 about tube 20 whereby firmly to mount seat 40 upon tube 20. It will be seen that clamp 50 can be positioned at any desired point along tube 20 whereby to accommodate different sizes of children.

A pair of braces 60 is connected to seat support 42 and extend downwardly and forwardly toward support tube 20. The forward ends of braces 60 are connected and in turn are pivotally connected to a clamp 62. More specifically, clamp 62 has a pair of rearwardly disposed spaced apart flanges 64 and 66 which are apertured whereby to receive therethrough a bolt 68 passing also through an aperture in brace 60. A nut 70 is threadedly received on one end of bolt 68 whereby firmly to clamp braces 60 on clamp 62. Formed on the opposed free ends of clamp 62 is a pair of outwardly extending flanges 72 and 74 which are provided with aligned apertures to receive therethrough a bolt 76. One end of bolt 76 is provided with an enlarged head and on the other end is threaded whereby threadedly to receive a nut 78. Clamp 62 can be placed about tube 20 as illustrated in Figure 5 and securely clamped thereto in any desired adjusted position by tightening nut 78 upon bolt 76.

A child positioned upon seat 40 can utilize cross bar 22 as a support for his hands since cross bar 22 is preferably spaced rearwardly from the rear surface of seat back 16 as can be best seen in Figure 1 of the drawing. It also is desirable to provide a rest for the child's feet. To this end a foot rest generally designated by the numeral 80 is provided. Foot rest 80 includes a circular clamp 82 which is adapted to extend around support tube 20. Formed integral with and extending outwardly from opposite sides of clamp 82 are individual foot supports 84 which are suitably shaped to receive the feet of a child. More specifically, by reference to Figure 2 it will be seen that the foot supports 84 are generally U-shaped whereby to provide a firm rest for a child's feet. Means is provided to adjust the position of foot rest 80 upon support tube 20. More specifically, the free ends of clamp 82 are provided with outwardly extending substantially parallel flanges 86 and 88. Flanges 86 and 88 are apertured to receive therethrough a bolt 90. One end of bolt 90 is provided with an enlarged head and the other end is threaded. The threaded end of bolt 90 receives a threaded nut 92. Foot rest 80 can be placed at any desired position upon support tube 20 by tightening nut 92 upon bolt 90.

In mounting the auxiliary seat 10 within an automobile, bolt 34 is first removed and hooks 24 and 26 placed over the top of the back rest 16. Post 28 is then moved downwardly and is preferably forced downwardly to deform the suction cup 38. Bolt 34 is then inserted through aligned apertures 30 and 32 and nut 36 threaded thereon and tightened.

Seat support 42 is then moved to the desired position by loosening nut 58 on bolt 56. When the desired adjusted position is achieved, nut 58 is tightened whereby firmly to clamp seat support 42 in the adjusted position. Brace 60 will have been moved to the proper position and clamp 62 is tightened about support tube 20 by threading nut 78 upon bolt 76.

The child is then placed upon seat 40 and the foot rest 80 moved to the desired position. Nut 92 is then tightened on bolt 90 whereby to tighten clamp 82 about support tube 20.

In use, the weight of the child upon seat 40 will push the suction cup 38 downwardly whereby the suction cup firmly grips floor 12. The hooks 24 and 26 firmly engage the top of back rest 16 and these two support points firmly hold the auxiliary seat 10 in the desired operative position. The child seated upon seat 40 can utilize the cross bar 22 to support his hands. His feet are supported by foot rest 80. Various novelty seat forms such as saddles, horses' backs and the like can be utilized to provide novelty and entertainment. Since the auxiliary seat 10 is positioned between the front and back seats, this frees both the front and back seats for use to seat other persons or for carrying of articles and the like. Because seat 40 is positioned behind and below the back rest 16, the tendency of the child to be thrown forwardly out of the seat is resisted. The child may be thrown against the back of seat 16 and against cross bar 22 and tube 20, but the child will not be exposed to the danger of being thrown over front seat 14 and through the windshield in cases of sudden stops. Accordingly, the seat is attractive to the child in use and in addition insures the child's safety.

Although one preferred form of the invention has been shown for purposes of illustration, it is to be understood that various changes and modifications can be made therein without departing from the spirit and scope of the invention. Accordingly, the invention is to be limited only as set forth in the following claims.

I claim:

1. An auxiliary child's seat for use in an automobile having a support floor and a front seat back rest extending upwardly therefrom, comprising an adjustable support means adapted to be disposed behind the back rest and extending from the top of the back rest to the support floor, anti-skid means mounted on the lower end of said support means and adapted to engage the support floor, a hook mounted on the upper end of said support means and adapted to engage over the top of the back rest, a seat positioned behind said support means, means adjustably mounting said seat upon said support means, a brace interconnecting said seat and said support means at a point below the interconnection between said seat and said support means, a foot rest, and means adjustably mounting said foot rest upon said support means below said seat.

2. An auxiliary child's seat for use in an automobile having a support floor and a front seat back rest extending upwardly therefrom, comprising a support adapted to be positioned vertically behind the front seat back rest, siad support including a hollow support tube and a post extending upwardly into said tube, a hook mounted on the upper end of said support tube and adapted to engage over the top of the back rest, an anti-skid member mounted on the lower end of said post, means adjustably interconnecting said tube and said post whereby said hook can be positioned upon the top of the back rest and said anti-skid member can be securely positioned upon the floor, a seat, means adjustably mounting said seat upon said support tube, a foot rest, and means mounting said foot rest on said support tube below said seat and adjustable along said support tube.

3. An auxiliary child's seat for use in an automobile having a support floor and a front seat back rest extending upwardly therefrom, comprising a post adapted to be disposed behind the back rest and positioned substantially vertically, a suction cup mounted on the lower end of said post and adapted to engage the floor, a hollow support tube having the upper end of said post disposed in the lower end thereof, a cross bar mounted on the upper end of said support tube and adapted to extend along the back of the back rest and spaced rearwardly therefrom, a hook mounted on each end of said cross bar and adapted to engage over the top of the back rest, means adjustably interconnecting said support tube and said post so that said hooks can be firmly positioned upon the top of the back rest and said suction cup can be firmly disposed on the floor, a seat, means adjustably mounting said seat upon said support tube, a brace interconnecting said seat and said support tube at a point below the interconnection between said seat and said support tube, a foot rest, and means adjustably mounting said foot rest upon said support tube below said seat.

4. An auxiliary car seat as set forth in claim 3, wherein the means adjustably interconnecting the support tube and the post includes aligned apertures in said support tube and said post and a bolt passing through one set of aligned apertures, and the means adjustably mounting the seat on the support tube and the means adjustably mounting the foot rest on the support tube include clamps disposed about said support tube and having bolts to tighten the clamps about the support tube.

References Cited in the file of this patent

UNITED STATES PATENTS

| | | |
|---|---|---|
| 1,167,453 | Warren | Jan. 11, 1916 |
| 1,197,657 | Orofino | Sept. 12, 1916 |
| 1,207,074 | Pike | Dec. 5, 1916 |
| 2,072,513 | Carpenter | Mar. 2, 1937 |
| 2,499,103 | Love | Feb. 28, 1950 |
| 2,546,871 | Schley | Mar. 27, 1951 |
| 2,675,056 | Bell | Apr. 13, 1954 |

FOREIGN PATENTS

| | | |
|---|---|---|
| 236,402 | Great Britain | July 9, 1925 |